US012679273B2

(12) United States Patent
Tsuchiya

(10) Patent No.: US 12,679,273 B2
(45) Date of Patent: Jul. 14, 2026

(54) MOVABLE APPARATUS

(71) Applicant: CANON KABUSHIKI KAISHA, Tokyo (JP)

(72) Inventor: Tomoaki Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/945,683

(22) Filed: Nov. 13, 2024

(65) Prior Publication Data

US 2025/0178534 A1      Jun. 5, 2025

(30) Foreign Application Priority Data

Dec. 1, 2023      (JP) .................................. 2023-203667

(51) Int. Cl.
B60R 1/00          (2022.01)
B60R 1/24          (2022.01)
B60R 1/25          (2022.01)

(52) U.S. Cl.
CPC .................. B60R 1/24 (2022.01); B60R 1/25 (2022.01); B60R 2300/802 (2013.01); B60R 2300/8033 (2013.01)

(58) Field of Classification Search
None
See application file for complete search history.

(56) References Cited

U.S. PATENT DOCUMENTS

| | | | |
|---|---|---|---|
| 12,165,419 B2 | 12/2024 | Tsuchiya | |
| 2023/0114340 A1* | 4/2023 | Imai ....................... | H04N 23/69 |
| | | | 348/118 |

| | | |
|---|---|---|
| 2024/0114252 A1 | 4/2024 | Tsuchiya |
| 2024/0114253 A1 | 4/2024 | Tsuchiya |
| 2025/0178534 A1 | 6/2025 | Tsuchiya |

FOREIGN PATENT DOCUMENTS

| | | |
|---|---|---|
| JP | 6349558 B1 | 7/2018 |
| WO | 2023/145690 A1 | 8/2023 |

OTHER PUBLICATIONS

Kobayashi. "WO 2023/145690 A1 Translation". Aug. 3, 2023. (Year: 2023).*
Extended European Search Report issued by the European Patent Office on Mar. 25, 2025 in corresponding EP Patent Application No. 24213544.0.

* cited by examiner

*Primary Examiner* — Zhihan Zhou
(74) *Attorney, Agent, or Firm* — Carter, DeLuca & Farrell LLP

(57)          ABSTRACT

A movable apparatus comprises an image capturing apparatus configured to include an optical system that forms an optical image having a high-resolution region on the outer side of an optical axis on a light-reception surface of an image capturing unit, wherein the image capturing apparatus is arranged so as to capture images in a forward direction of the movable apparatus, in a side direction of the movable apparatus, in a vertically downward facing direction to a side of the movable apparatus, and in a vertically downward facing direction in a forward direction of the movable apparatus, and wherein the image capturing apparatus is arranged such that the high resolution region of the optical system captures images in the forward direction of the movable apparatus.

11 Claims, 9 Drawing Sheets

MOVABLE APPARATUS

BACKGROUND OF THE INVENTION

Field of the Invention

The present invention relates to a movable apparatus capable of capturing images of the surroundings thereof by using an image capturing apparatus.

Description of the Related Art

In recent years, Camera Monitor System (CMS) technology, which replaces mirrors mounted on vehicles such as automobiles with electronic mirrors, has been promoted. A plurality of image capturing apparatuses (cameras) installed on a vehicle for a CMS may be installed so as to be able to capture (perform image capturing of) all directions as "eyes" of an electronic system for checking safety.

In addition, the UN regulation UN-R46 (regulations related to indirect vision for automobiles) defines blind spots of a driver, and a CMS is required to perform image capturing and be installed in a manner that reduces blind spots, similar to existing mirrors.

In addition, a vehicle provided with a Moving Off Information System (MOIS) function has a camera installed in the forward direction of the vehicle so as to be able to detect pedestrians and bicycles in blind spots in the forward direction of the vehicle.

In addition, a vehicle provided with a side collision detection device has cameras and sensors installed so as to be able to detect pedestrians and bicycles in the side direction or in the forward direction of the vehicle. In addition, a vehicle provided with a Cross Traffic Alert (CTA) function has cameras installed in the front and rear of the vehicle, each capable of capturing left-right directions with high resolution, so as to be able to detect the approach of other vehicles crossing in front of or behind the vehicle.

Japanese Patent No. 6349558 discloses capturing images behind a vehicle by using a camera provided with an optical system capable of capturing a part of an image capturing region with high resolution.

However, because the camera having high resolution in a part of the image capturing region used in Japanese Patent No. 6349558 could not perform image capturing of a wide range with high resolution, in a case in which it was necessary to perform image capturing of a wide range with high resolution, cameras needed to be prepared in large numbers so as to be able to cover that wide range. For this reason, conventionally, there was room for improvement in performing image capturing of the surroundings of a vehicle.

SUMMARY OF THE INVENTION

A movable apparatus according to one embodiment of the present invention is a movable apparatus comprising an image capturing apparatus configured to include an optical system that forms an optical image having a high-resolution region on the outer side of an optical axis on a light-reception surface of an image capturing unit, wherein the image capturing apparatus is arranged so as to capture images in a forward direction of the movable apparatus, in a side direction of the movable apparatus, in a vertically downward facing direction to a side of the movable apparatus, and in a vertically downward facing direction in a forward direction of the movable apparatus, and wherein the image capturing apparatus is arranged such that the high resolution region of the optical system captures images in the forward direction of the movable apparatus.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
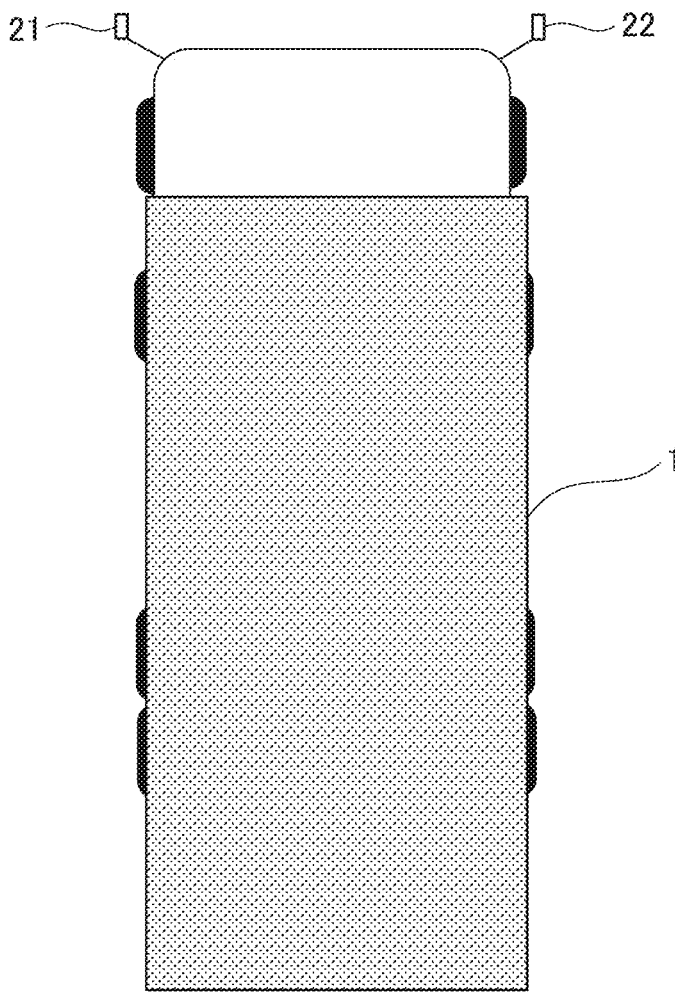
FIG. 1 is a diagram explaining the positional relationship between an image capturing apparatus and a vehicle according to a First Embodiment of the present invention.

In a First Embodiment, an installation method for an image capturing apparatus configured to capture high-resolution images for electronic side mirrors and forward CTA, and also to capture images for a forward monitoring apparatus will be explained. FIG. 1 is a diagram explaining the positional relationship between an image capturing apparatus and a vehicle of the First Embodiment of the present invention.

FIG. 1 is a diagram explaining the positional relationship between an image capturing apparatus and a vehicle according to the First Embodiment of the present invention. FIG. 1 shows an example in which an image capturing apparatus 21 is installed on the front left side of a vehicle 1, which is an automobile, and an image capturing apparatus 22 is installed on the front right side.

The vehicle 1 is an example of a movable apparatus. It should be noted that in the present embodiment, although it is explained that image capturing apparatuses are installed on both the left and right sides of the vehicle 1, in the present invention, the image capturing apparatus may be installed on only one side. In addition, in the present embodiment, the image capturing apparatuses 21 and 22 are shown in a case in which they are in-vehicle cameras.

The image capturing apparatuses 21 and 22 are installed so as to be able to capture images of the side surfaces of the vehicle 1 in order to capture images for electronic side mirrors. In addition, image capturing apparatuses 21 and 22 are installed so as to be able to capture images in a forward direction of the vehicle 1.

In addition, the image capturing apparatuses 21 and 22 are installed so as to be able to capture forward downward images for the forward monitoring apparatus of the vehicle 1. The image capturing apparatuses 21 and 22 are arranged so as to be able to capture images in a forward direction of the vehicle 1, in a side direction of the vehicle 1, in a vertically downward facing direction to a side of the vehicle 1, and in a vertically downward facing direction in a forward direction of the vehicle 1. Hereinafter, although image capturing apparatus 21 will be explained, because the configuration of the image capturing apparatus 22 is similar, an explanation of the image capturing apparatus 22 will be omitted.

Figure 2:
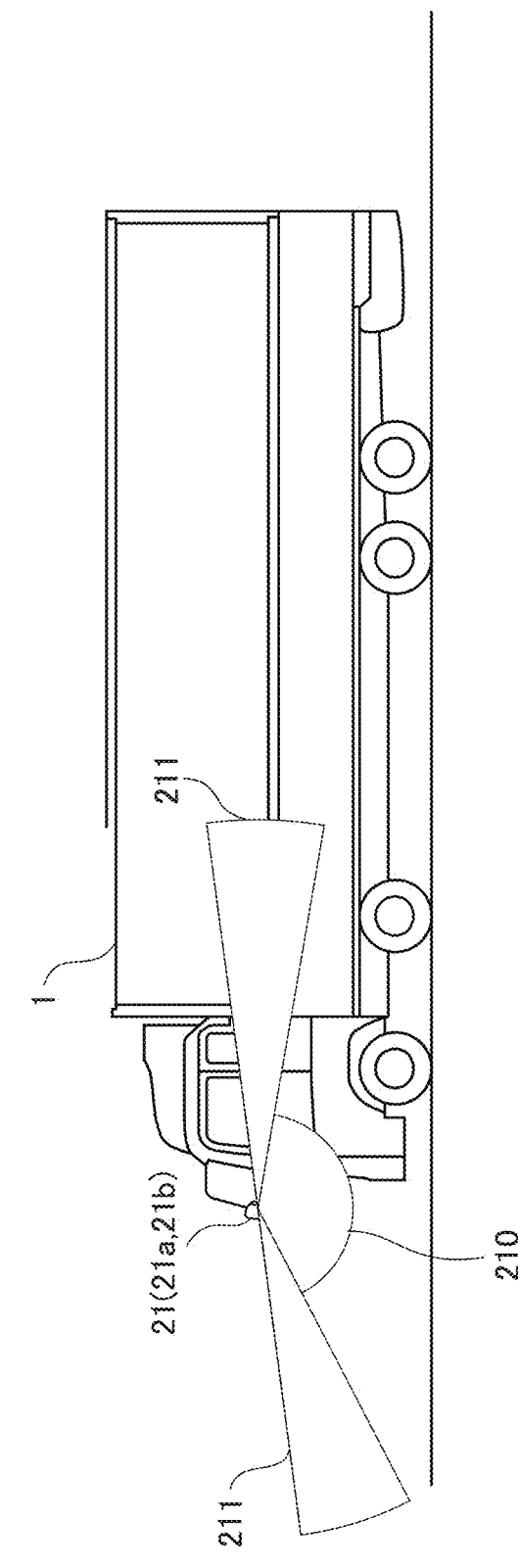
FIG. 2 is a side view of the image capturing apparatus and the vehicle 1 viewed from the side according to the First Embodiment of the present invention.

FIG. 2 is a side view of an image capturing apparatus and the vehicle 1 according to the First Embodiment of the present invention. FIG. 2 is a schematic diagram of the vehicle 1 and the image capturing apparatus 21 disposed thereon according to the First Embodiment.

The vehicle 1 is provided with an in-vehicle system (driving assistance device) (not shown) for assisting a user (driver, passenger, and the like) (not shown) by using images acquired by the image capturing apparatus 21. In the present embodiment, a case in which the image capturing apparatus 21 is installed on a side of the vehicle 1 is shown.

The image capturing apparatus 21 includes an optical system 21*a* and an image capturing unit 21*b*. The optical system 21*a* is an optical system having different image-forming magnifications in a first angle of view (first field of view) 210 and a second angle of view (second field of view) 211, wherein the second angle of view is more towards the peripheral side than the first angle of view 210.

The image capturing surface (light-reception surface) of the image capturing unit 21*b* includes a first region for capturing images of objects included in the first angle of view 210 and a second region for capturing images of objects included in the second angle of view 211. In this case, the number of pixels per unit angle of view in the second region is greater than the number of pixels per unit angle of view in the first region.

That is, the resolution in the second angle of view 211 (second region) of the image capturing apparatus 21 is higher than the resolution in the first angle of view 210 (first region).

Figures 3A, 3B:
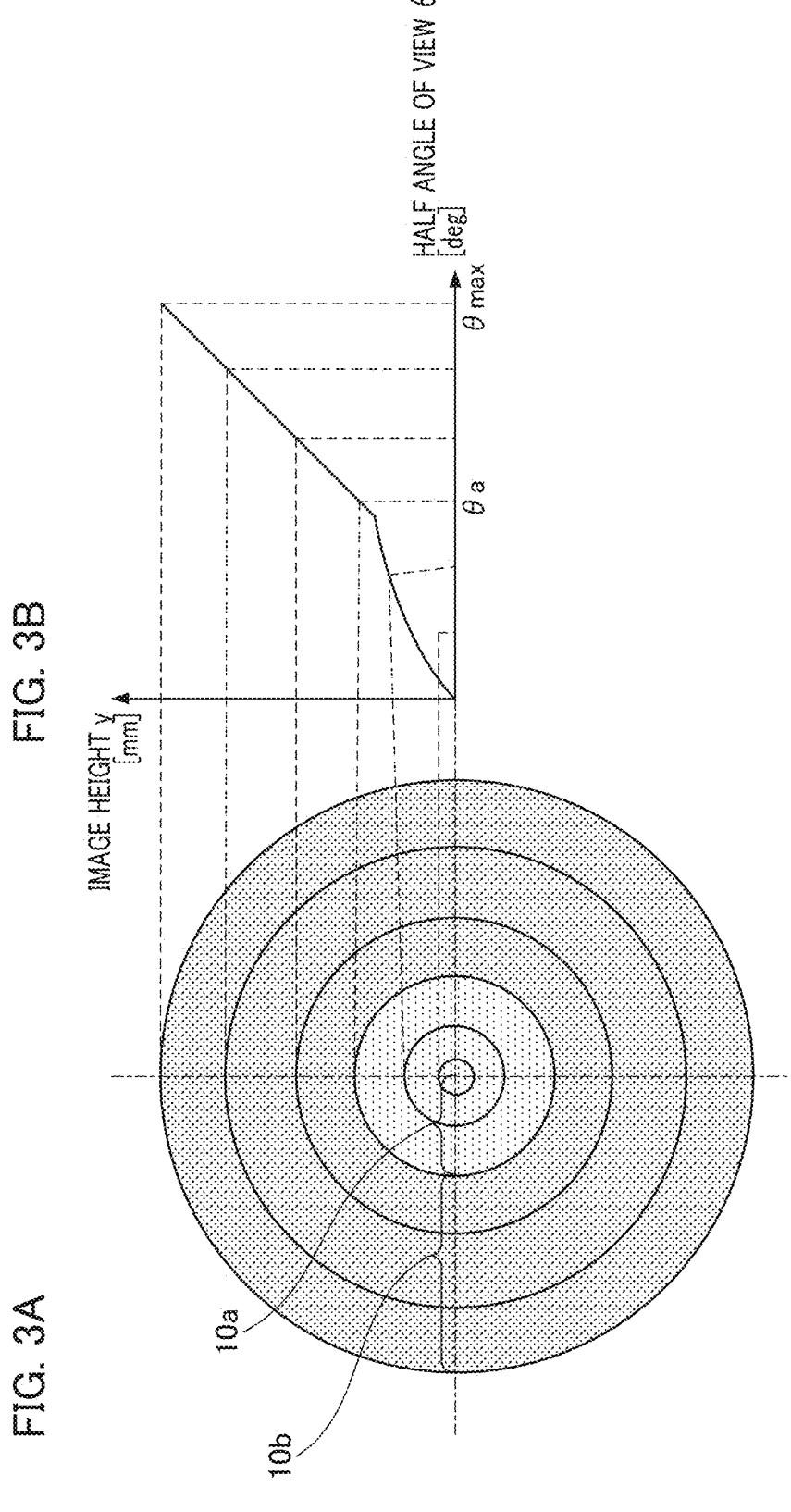
FIG. 3A and FIG. 3B are diagrams for explaining optical characteristics of an image capturing apparatus 21 according to the First Embodiment of the present invention.

FIG. 3A and FIG. 3B are diagrams for explaining optical characteristics of the image capturing apparatus 21 according to the First Embodiment of the present invention. The optical characteristics of the optical system 21*a* will be explained with reference to FIG. 3A and FIG. 3B.

FIG. 3A is a diagram showing the image height y at each half angle of view on the image capturing surface (light-reception surface) of the image capturing unit 21*b* as contour lines. FIG. 3B is a diagram showing the relationship between the half angle of view θ and the image height y (projection characteristic of the optical system 21*a*) in a first quadrant of FIG. 3A.

As shown in FIG. 3B, the optical system 21*a* is configured such that the projection characteristic y(θ) differs between an angle of view less than a predetermined half angle of view θa and an angle of view equal to or greater than the half angle of view θa. Therefore, the optical system 21*a* is configured such that when the resolution is defined as the amount of increase in image height y per unit half angle of view θ, the resolution thereof differs depending on the angle of view (region on the light-reception surface of the image capturing unit).

This local resolution can be expressed by the differential value dy(θ)/dθ of the projection characteristic y(θ) at the half angle of view θ. For example, it can be said that the larger the slope of the projection characteristic y(θ) in FIG. 3B, the higher the resolution. In addition, in FIG. 3A, the larger the interval between the contour lines of the image height y at each half angle of view, the higher the resolution is indicated to be.

The optical system 21*a* of the present embodiment has projection characteristics wherein the rate of increase in image height y (the slope of the projection characteristic y(θ) in FIG. 3B) is small in the central region near the optical axis, and in the peripheral region on the outer side of the central region, the rate of increase in image height y becomes larger as the angle of view becomes larger.

In FIG. 3A, a first region 10*a* that includes the center corresponds to an angle of view less than the half angle of view θa, and a second region 10*b* on the outer side of the first region corresponds to an angle of view equal to or greater than the half angle of view θa. In addition, the angle of view less than the half angle of view θa corresponds to the first angle of view 210 in FIG. 2, and the angle of view equal to or greater than the half angle of view θa corresponds to the second angle of view 211 in FIG. 2.

As described above, the first region 10*a* is a relatively low-resolution region, and the second region 10*b* is a relatively high-resolution region. In this manner, the optical system of the present embodiment realizes both a high-resolution region that has higher resolution compared to the central region and a low-resolution region near the center.

It should be noted that the characteristics shown in FIG. 3A and FIG. 3B are examples, and the present invention is not limited thereto. For example, the low-resolution region and the high-resolution region of the optical system need not be configured concentrically, and each region may have a distorted shape.

In addition, the center of gravity of the low-resolution region and the center of gravity of the high-resolution region need not coincide. Furthermore, the center of gravity of the low-resolution region and the center of gravity of the high-resolution region may be offset from the center of the light-reception surface of the image capturing unit. In the optical system of the present embodiment, the low-resolution region need only be formed near the optical axis, and the high-resolution region need only be formed on the peripheral side near the optical axis.

The optical system 21*a* is configured to satisfy Equation 1, where f is the focal length, θ is the half angle of view, y is the image height on the image surface, y(θ) is the projection characteristic representing the relationship between the image height y and the half angle of view θ, and θmax is the maximum half angle of view that the optical system possesses.

That is, the optical system 21*a* is configured such that the projection characteristic y(θ) is different from 2f tan(θ/2) (stereographic projection method).

$$0.2 < 2 \times f \times \tan(\theta \text{max}/2)/y(\theta \text{max}) < 0.92 \qquad \text{(Equation 1)}$$

In an optical system having such optical characteristics, by adjusting the projection characteristic y(θ), the magnification in the radial direction with respect to the optical axis can be adjusted. Thereby, because the aspect ratio in the radial direction and the circumferential direction with respect to the optical axis can be controlled, unlike conventional fisheye lenses and the like, a high-resolution image having little distortion in the peripheral region can be obtained while having a wide angle of view.

In addition, by satisfying Equation 1, the resolution in the second region 10b can be made higher than that of an optical system using the stereographic projection method. If the resolution in the second region 10b exceeds the upper limit specified by Equation 1, the resolution in the second region 10b decreases, and the difference from the resolution in the first region 10a becomes smaller, which is undesirable. In addition, if the resolution falls below the lower limit specified by Equation 1, it becomes difficult to satisfactorily correct various aberrations such as image surface curvature, which is undesirable.

It should be noted that the above-described Equation 1 is an example, and the optical system in the present embodiment is not limited thereto.

By configuring the optical system as described above, whereas high resolution is obtained in the high-resolution region, in the low-resolution region, the increase in image height y per unit half angle of view θ is made smaller, thereby making it possible to capture a wider angle of view. Therefore, while having a wide angle of view equivalent to a fisheye lens as the capturing range, high resolution can be obtained in the high-resolution region.

In addition, in the present embodiment, in the high-resolution region, the projection characteristic is approximated to the stereographic projection method (y=2×f×tan(θ/2), which is the projection characteristic of optical systems for general image capturing. Therefore, in the high-resolution region, it is possible to generate detailed images.

Figure 4:
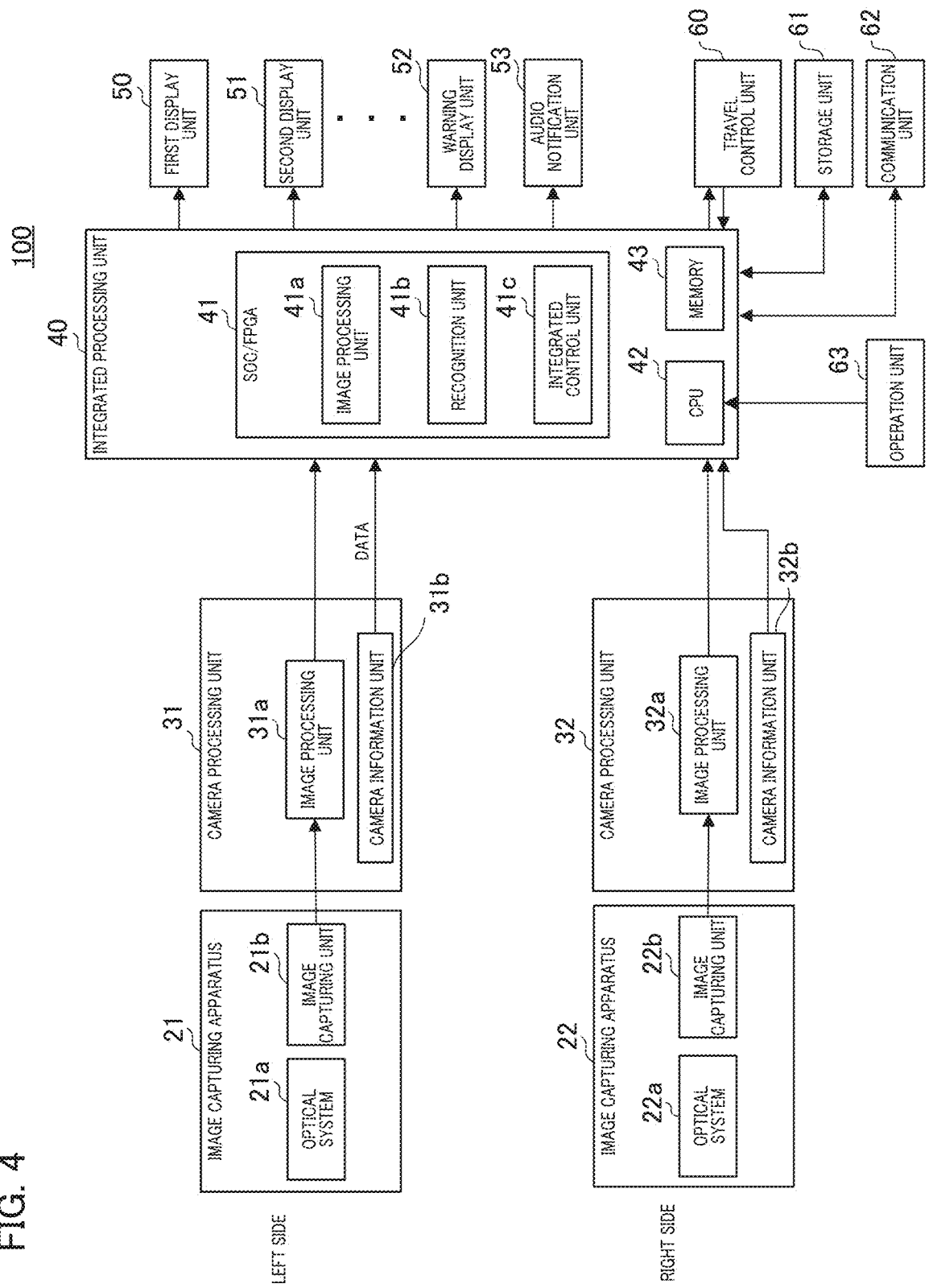
FIG. 4 is a diagram for explaining an image processing system 100 according to the First Embodiment of the present invention.

Next, the configuration of the image processing system in the present embodiment will be explained by using FIG. 4. FIG. 4 is a block diagram showing the configuration of an image processing system 100 according to the First Embodiment of the present invention.

FIG. 4 is a diagram for explaining the image processing system 100 according to the First Embodiment. The image processing system 100 is included in an in-vehicle system (driving assistance device) (not shown). The image capturing apparatus 21 consists of the optical system 21a and the image capturing unit 21b. The image capturing apparatus 22 consists of an optical system 22a and an image capturing unit 22b.

The optical system 21a of the image capturing apparatus 21 is configured by one or more optical lenses and has optical characteristics as shown in FIG. 2A. The optical system 22a of the image capturing apparatus 22 is configured by one or more optical lenses and has optical characteristics as shown in FIG. 2B. In addition, the optical system 21a forms (images) an optical image on the light-reception surface of the image capturing unit 21b, and the optical system 22a forms (images) an optical image on the light-reception surface of the image capturing unit 22b.

The image capturing units 21b and 22b function as image capturing means, and output imaging signals by photoelectrically converting the formed optical image. It should be noted that, for example, R, G, and B color filters are arranged in a Bayer array for each pixel on the light-reception surfaces of the image capturing units 21b and 22b, and R, G, and B pixel signals are sequentially output as image capturing signals from the image capturing unit 21.

A camera processing unit 31 has a function of processing the image capturing signals output from the image capturing unit 21b, and a camera processing unit 32 has a function of processing the image capturing signals output from the image capturing unit 22b. The camera processing unit 31 has an image processing unit 31a and a camera information unit 31b, and the camera processing unit 32 has an image processing unit 32a and a camera information unit 32b.

A CPU serving as a computer and a memory serving as a storage medium having a computer program stored therein are incorporated in the camera processing units 31 and 32, and the CPU executes the computer program in the memory. Thereby, the camera processing units 31 and 32 are configured to execute processing therein. CPU is an abbreviation for Central Processing Unit.

It should be noted that the camera processing units 31 and 32 are not limited to the above-described configuration, and the image processing units 31a and 32a may be configured by, for example, hardware such as a dedicated circuit (ASIC) or a processor (a reconfigurable processor or a DSP).

ASIC is an abbreviation for Application Specific Integrated Circuit. DSP is an abbreviation for Digital Signal Processor.

The image processing units 31a and 32a perform various types of image correction processing such as white balance adjustment, gain and offset adjustment, gamma processing, color matrix processing, reversible compression processing, and distortion correction processing on the image capturing signals output from the image capturing units 21b and 22b.

In addition, for example, image data input according to a Bayer array from each of the image capturing units 21b and 22b are subjected to debayer processing and converted into image data in a RGB raster format. It should be noted that some of the image processing as described above may be performed by other blocks of the image processing system 100 other than the image processing units 31a and 32a.

The camera information unit 31b functions as a holding unit configured to hold camera information such as characteristic information related to characteristics of the optical image and position and posture information of the image capturing apparatus 21, and holds the camera information of the image capturing apparatus 21 in memory in advance. The camera information unit 32b functions as a holding unit configured to hold camera information such as characteristic information related to characteristics of the optical image and position and posture information of the image capturing apparatus 22, and holds the camera information of the image capturing apparatus 22 in memory in advance. In addition, the camera information unit 31b may hold information from various sensors provided in the image capturing apparatus 21, and the camera information unit 32b may hold information from various sensors provided in the image capturing apparatus 22.

The camera information held in the camera information units 31b and 32b includes, for example, characteristic information of the optical systems 21a and 22a, and the number of pixels of the image capturing units 21b and 22b. In addition, the camera information includes mounting position information and posture (pitch, roll, yaw, or the like) of the image capturing apparatuses 21 and 22 in vehicle coordinates, the optical axis direction, image capturing range information, and the like. In addition, the camera information may include information such as gamma characteristics, sensitivity characteristics, frame rate, image format, and the like of a video output from the camera processing unit 31.

Because in many cases, the attachment position with respect to the vehicle is fixed for each image capturing apparatus, the attachment position information of the image capturing apparatus is stored in advance in a memory in the camera information unit as relative coordinates with respect to the vehicle 1. In addition, the camera information may be information unique to the image capturing units 21*b* and 22*b* (for example, aberration characteristics of lenses or noise characteristics of image capturing units, and the like). The camera information is transmitted to an integrated processing unit 40, and the camera information is referenced when the integrated processing unit 40 performs image processing necessary for displaying on the display unit and the like.

The integrated processing unit 40 has a function of displaying video signals obtained from the image capturing apparatuses 21 and 22 on display devices such as a first display unit 50 and a second display unit 51, and a function of notifying a warning display unit 52 or an audio notification unit 53 of video signals. Furthermore, the integrated processing unit 40 has functions such as recognizing an image of a target object crossing a boundary between image capturing ranges of the image capturing apparatuses 21 and 22.

The integrated processing unit 40 includes a SOC/FPGA 41, a CPU 42 serving as a computer, and a memory 43 serving as a storage medium. SOC is an abbreviation for System On Chip. FPGA is an abbreviation for Field Programmable Gate Array. In the present embodiment, the integrated processing unit 40 is explained as being housed in a housing separate from the image capturing apparatus.

It should be noted that some or all of the functional blocks included in the integrated processing unit 40 and the like may be realized by hardware or may be realized by the CPU 42. As hardware, a dedicated circuit (ASIC) or a processor (a reconfigurable processor, DSP) and the like can be used. The CPU 42 performs various controls of the entire image processing system 100 by executing a computer program stored in the memory 43.

The SOC/FPGA 41 includes an image processing unit 41*a*, a recognition unit 41*b*, and an integrated control unit 41*c*. The image processing unit 41*a* has a function of performing image processing such as resolution conversion for display on a display device, and the like, based on the image signal acquired from the camera processing unit 31 and the image signal acquired from the camera processing unit 32 and the camera information.

As previously mentioned, the camera information includes optical characteristics of the optical systems 21*a* and 22*a*, the number of pixels of the image capturing units 21*b* and 22*b*, photoelectric conversion characteristics, gamma characteristics, sensitivity characteristics, format information of the image signal, and coordinates of an attachment position or posture information of the image capturing apparatus at vehicle coordinates, and the like.

For example, the image processing unit 41*a* combines the image signal of the low resolution region 10*b* and the image signal of the high resolution region 10*b* of the image capturing unit 21*b* subjected to distortion correction to connect the image signals smoothly and form an overall image of the image capturing unit 21*b*. The image processing unit 41*a* also combines the image signal of the low resolution region 10*b* and the image signal of the high resolution region 10*b* of the image capturing unit 22*b* subjected to distortion correction to connect the image signals smoothly and form an overall image of the image capturing unit 22*b*. In addition, the image processing unit 41*a* performs image processing such as image rotation based on information on the installation position and posture of the camera in the camera information, and transmits the image signal to the display device.

The recognition unit 41*b* performs image recognition processing on a combination image obtained by connecting the images from the image capturing units 21*b* and 22*b*. The recognition unit 41*b* generates an image recognition result by performing image recognition of a predetermined target object (for example, an automobile, person, obstacle, and the like) in the combination image obtained from the image capturing units 21*b* and 22*b*.

It should be noted that the integrated control unit 41*c* has a function of forming a video signal for displaying a desired image on the first display unit 50, the second display unit 51, and the like from the overall images for each of the image capturing units 21*b* and 22*b* subjected to the image processing.

In addition, the integrated control unit 41*c* generates CG for, for example, a frame for highlighting the recognized target object, information related to the type, size, position, speed, or the like of the target object, and a warning. CG is an abbreviation for Computer Graphics.

Furthermore, the integrated control unit 41*c* may generate a CG of a boundary image for displaying the boundary on the basis of characteristic information of the optical system such as display resolution boundary information and the like acquired from the camera information units 31*b* and 32*b*. The integrated control unit 41*c* performs display processing and the like for superimposing these CG or text on an image. Here, the first display unit 50 and the second display unit 51 display image signals or integrated image recognition results.

Furthermore, the integrated control unit 41*c* performs communication with a travel control unit 60 (for example, an ECU) and the like via communication unit (not shown) provided internally by using protocols such as CAN, FlexRay (registered trademark), Ethernet (registered trademark), and the like. ECU is an abbreviation for Electronic Control Unit.

CAN is an abbreviation for Controller Area Network. Accordingly, the integrated control unit 41*c* performs display processing for appropriately changing information to be displayed on the basis of a vehicle control signal received from the travel control unit 60 and the like. That is, for example, the integrated control unit 41*c* can change a range of an image to be displayed on a display unit and the like according to a moving state of the vehicle acquired by the vehicle control signal.

The travel control unit 60 is mounted on the vehicle 1, and the travel control unit 60 is a unit that incorporates a computer and memory for comprehensively performing drive control, direction control, and the like of the vehicle 1. The travel control unit 60 outputs to the integrated processing unit 40, as the vehicle control signal, information related to the travel (movement state) of the vehicle 1, such as travel speed, travel direction, shift lever position, shift gear, turn signal status, vehicle orientation from a geomagnetic sensor or the like, GPS information, and the like.

In addition, the integrated control unit 41*c* may include a function of transmitting information such as a type, position, movement direction, or movement speed and the like of a predetermined target object (such as an obstacle and the like) recognized by the recognition unit 41*b* to the travel control unit 60. Accordingly, the travel control unit 60 performs necessary controls such as stopping the vehicle 1, driving the vehicle 1, and avoidance of obstacles such as changing a direction of travel. It should be noted that the travel control unit 60 functions as a movement control unit configured to control the movement of the vehicle on the basis of the integrated image recognition result.

The first display unit 50 is, for example, a display device that is installed near the center in a vehicle width direction above the front of a driver seat of the vehicle 1, wherein the display screen thereof is directed to the rear of the vehicle, and functions as an electronic under mirror and an electronic side under mirror.

In addition, the first display unit 50 may be configured to be provided with a touch panel or operation buttons, acquire instructions from the user, and output the instructions to the integrated control unit 41*c*. Furthermore, the first display unit 50 can be used as a display device configured to display images for electronic side mirrors for checking left and right obstacles and the like instead of an optical side mirror, or for a forward CTA. The first display unit 50 receives and displays a video signal with an angle of view required for display according to the purpose of the first display unit 50 generated by the integrated control unit 41*c*.

The second display unit 51 is a display device that is installed, for example, around an operation panel near the center in the vehicle width direction in the forward direction of the driver seat of the vehicle 1, and functions as a display device for displaying, for example, a downward direction in the forward direction of the vehicle. Similar to the first display unit, the second display unit 51 also functions as a display device that receives a necessary imaging region generated according to the purpose. The second display unit 51 receives and displays a video signal with an angle of view required for display according to the purpose of the second display unit 51 generated by the integrated control unit 41*c*.

For example, the second display unit 51 can also display various control signals and the like from a navigation system, an audio system, and the travel control unit 60. In addition, the second display unit 51 may be provided with a touch panel or operation buttons, and configured to be capable of acquiring instructions from the user.

In addition, the second display unit 51 may be, for example, a display unit of a tablet terminal, and can perform a display by connecting to the integrated processing unit 40 by wire, or can wirelessly receive an image via a communication unit 62 and display the image. It should be noted that a liquid crystal display, an organic EL display, or the like can be used as display elements of the first display unit 50 and the second display unit 51, and the number of display units is not limited to one.

The integrated control unit 41*c* determines whether a movable object is included in the image on the basis of the recognition result output by the recognition unit 41*b*, and outputs the recognition result. The movable object here is, for example, a bicycle, a pedestrian, another vehicle, or the like, and is called a "detection target" in the present embodiment. The recognition result output by the integrated control unit 41*c* includes the presence or absence of a detection target, a type and coordinates of the detection target, and speed information.

The warning display unit 52 performs, for example, a side collision warning to the driver using visual information on the basis of the recognition result output from the integrated control unit 41*c*. The warning display unit 52 may be configured by, for example, an LED, and may be configured to perform lighting up or blinking if the recognition result includes information indicating that the detection target exists.

In addition, the warning display unit 52 may be configured by a display such as a liquid crystal display. In this case, if the recognition result includes information indicating that the detection target exists, an icon, text information, or the like is output on the display. Furthermore, the warning display unit 52 can be installed, for example, near the end in the vehicle width direction in front of the driver seat of the vehicle 1, and the display screen of the warning display unit 52 can be directed toward the driver.

Furthermore, the warning display unit 52 may be configured to be installed, for example, near the first display unit 50 and the second display unit 51, or may be configured to substitute for the first display unit 50 and the second display unit 51.

The audio notification unit 53 outputs sound on the basis of the recognition result output from the integrated control unit 41*c*. For example, a speaker can be used to output sound for notification to the driver. It is desirable to install the audio notification unit 53, for example, near the end in the vehicle width direction in front of the driver seat of the vehicle 1.

In addition, the integrated control unit 41*c* performs control to change content of an alarm output by the warning display unit 52 or the audio notification unit 53 on the basis of the coordinates or speed of the detection target obtained by the recognition unit 41*b*. Furthermore, the integrated control unit 41*c* may be configured to control the warning display unit 52 so that a warning level is higher when a distance to the detection target is shorter. Furthermore, the integrated control unit 41*c* may be configured to control the warning display unit 52 and the audio notification unit 53 so that a warning notification is not performed in a case in which the detection target is moving away from the vehicle 1.

For example, it is desirable for the integrated control unit 41*c* to control the audio notification unit 53 so that a volume of the notification increases as a distance between the detection target and the side of the vehicle 1 becomes shorter. It should be noted that the integrated control unit 41*c* may be configured to determine whether or not a traveling speed of the vehicle 1 input from the travel control unit 60 is equal to or smaller than a predetermined value, and perform a warning display using the warning display unit 52 or a warning notification using the audio notification unit 53 only in a case in which the traveling speed is equal to or smaller than the predetermined value.

In a case in which the traveling speed of the vehicle 1, that is, the host vehicle, is high, the detection target is likely not to be correctly recognized, and thus, by adopting a configuration like that of the Present Embodiment, it is possible to improve the possibility of performing correct side detection. In this case, it is desirable for the predetermined value of the traveling speed of the vehicle 1 (threshold value for whether or not to perform a warning) to be 30 km/h.

Furthermore, compared to a case in which the detection target is stationary, there is a higher possibility of collision with the vehicle 1 in a case in which the detection target is moving. Therefore, the integrated control unit 41*c* may be configured to determine whether the speed of the detection target is within a predetermined range, and the integrated control unit 41*c* may be configured to perform the warning display using the warning display unit 52 or the warning notification using the audio notification unit 53 only in a case in which the integrated control unit 41*c* determines that the speed of the detection target is within the predetermined range. In this case, for example, it is desirable for the predetermined range of the speed of the predetermined detection target to be 5 km/h or more and 20 km/h or less.

Furthermore, the integrated control unit 41c determines whether the vehicle 1 is turning right or left on the basis of movement direction information of the vehicle 1 that was output from the travel control unit 60, and performs the warning display using the warning display unit 52 or the warning notification using the audio notification unit 53 only in a case in which the vehicle 1 is turning right or turning left.

It should be noted that in the present embodiment, although the integrated processing unit 40 is mounted on the vehicle 1, processes of some of the image processing unit 41a, the recognition unit 41b, and the integrated control unit 41c of the integrated processing unit 40 may be performed by an external server or the like via a network, for example.

In this case, although the image capturing units 21b and 22b are mounted on the vehicle 1, for example, it becomes possible for some of the functions of the camera processing units 31 and 32 and the integrated processing unit 40 to be processed by the external server or the like. Furthermore, it is possible for the travel control unit 60 to have some or all of the functions of the integrated processing unit 40.

A storage unit 61 records an entire image generated by the integrated processing unit 40 for each of the image capturing units 21b and 22b. Furthermore, the storage unit 61 records a CG of a predetermined frame, text, warning, and the like indicating the recognized target object, and images superimposed with the CG and displayed on, for example, the first display unit 50 and the second display unit 51 together with, for example, a time, GPS information, and the like. The integrated processing unit 40 can also reproduce past information recorded on the storage unit 61 and display the past information on the first display unit 50 or the second display unit 51.

The communication unit 62 is for communicating with an external server or the like via a network, and can transmit information before being recorded in the storage unit 61, past travel history information and the like recorded in the storage unit 61 to the external server or the like, and store the information in the external server or the like.

Furthermore, the communication unit 62 can, as previously mentioned, transmit an image to an external tablet terminal or the like and display the image on the second display unit 51, which is the display unit of the tablet terminal. Furthermore, the communication unit 62 can acquire (receive) traffic jam information or various types of information from the external server or the like and display the information on the first display unit 50 or the second display unit 51 via the integrated processing unit 40.

An operation unit 63 is for inputting various instructions to the image processing system through an operation of a user. The operation unit 63 includes, for example, a touch panel, operation buttons, or the like.

Next, a relationship between characteristics and disposition of the image capturing apparatus 21 installed on the left front side and the image capturing apparatus 22 installed on the right front side will be explained. In the First Embodiment, the driver seat of the vehicle 1 is on the right side in the vehicle traveling direction, and the passenger seat is on the left side in the vehicle traveling direction, and the image capturing apparatus 21 is installed on the passenger seat side.

Figure 5A:
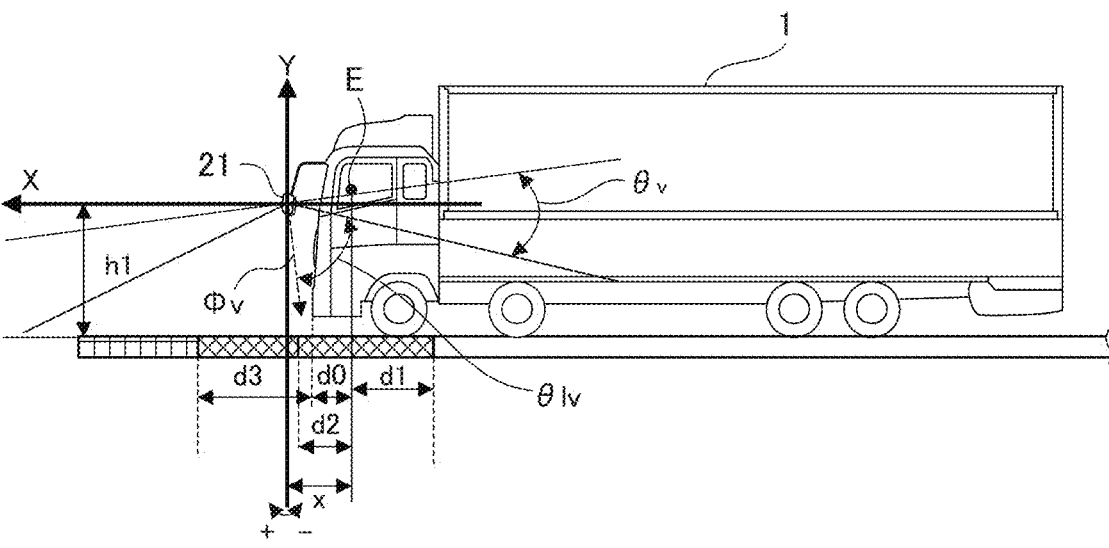
FIG. 5A is a side view of the vehicle 1 viewed from the side and FIG. 5B is a front view of the vehicle 1 viewed from in front according to the First Embodiment of the present invention.
Figure 5B:
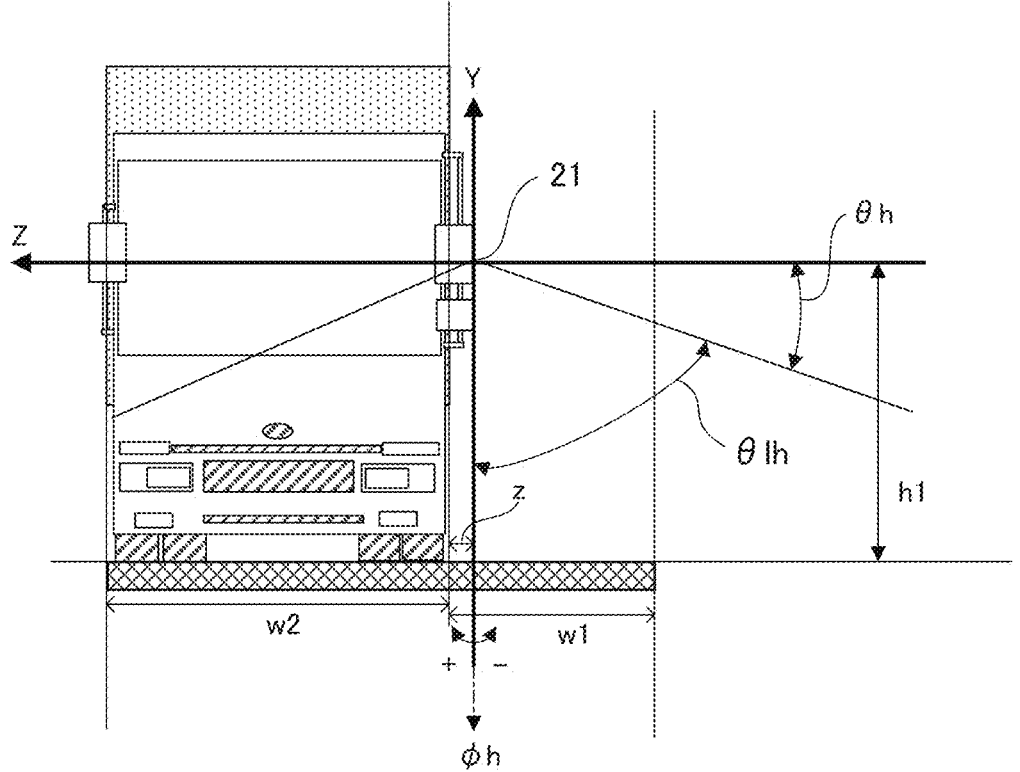

FIG. 5A and FIG. 5B are diagrams explaining the relationship between characteristics of the optical system of the image capturing apparatus 21 installed on the vehicle 1 of the First Embodiment and the image capturing region necessary for displays for electronic side mirrors and forward CTA. FIG. 5A is a side view of the vehicle 1 viewed from the side, and FIG. 5B is a front view of the vehicle viewed from the front.

In FIG. 5A and FIG. 5B, the X, Y, and Z directions have the installation position of the image capturing apparatus 21 as the origin. The X direction is the forward direction of the vehicle in the horizontal direction, as shown in FIG. 5A. The Z direction is the left direction in the horizontal direction toward the vehicle 1, as shown in FIG. 5B.

The Y direction is the upward direction in the vertical direction, as shown in FIG. 5A and FIG. 5B. For the X, Y, and Z directions, the direction indicated by the arrow is the positive (+) direction, and the opposite direction thereof is the negative (−) direction.

In the XY plane of FIG. 5A, using the vertical direction as a reference, an angle toward the +X direction from the −Y side of the Y-axis with the origin as the center is defined as a positive angle, and an angle toward the −X direction is defined as a negative angle. In the YZ plane of FIG. 5B, using the vertical direction as a reference, an angle toward the +Z direction from the −Y side of the Y-axis with the origin as the center is defined as a positive angle, and an angle toward the −Z direction is defined as a negative angle.

Viewpoint position E on the XY plane of FIG. 5A denotes a viewpoint position of the driver, which is an eye position of the driver at a seated position or a center position of a driver seat surface.

Using the above definition, the relationship between the optical axis of the image capturing apparatus 21 and the image capturing angle of view will be explained. $\varphi v$, $\theta v$, and $\theta l v$ in the XY plane of FIG. 5A will be explained. $\varphi v$ is the optical axis direction of the image capturing apparatus 21 and is an angle from the vertical direction. It should be noted that in the present embodiment, the optical axis of the image capturing apparatus is directed downward from the installation position. $\theta v$ is the angle of view of the high-resolution region 10b of the image capturing apparatus 21. $\theta l v$ is the half angle of view of the low-resolution region 10a of the image capturing apparatus 21.

$\varphi h$, $\theta h$, and $\theta l h$ in the YZ plane in FIG. 5B will be explained. $\varphi h$ is the optical axis direction of the image capturing apparatus 21 and is an angle from the vertical direction. $\theta h$ is the angle of view of the high-resolution region 10b of the image capturing apparatus 21. $\theta l h$ is the half angle of view of the low-resolution region 10a of the image capturing apparatus 21.

Using the above-described definition, the positional relationship of the image capturing apparatus 21 will be explained. The distance x in the XY plane of FIG. 5A is the horizontal distance between the image capturing apparatus 21 and the viewpoint position E, which is the viewpoint position of the driver. The distance h1 is the vertical distance between the image capturing apparatus 21 and the ground.

The distance z in the YZ plane of FIG. 5B is the distance between the installation position (first installation position) of the image capturing apparatus 21 and the side surface of the vehicle 1. Here, the image capturing regions necessary for a side under mirror and an under mirror display, which is called a vehicle near-field blind spot region, will be explained by using FIG. 5A, FIG. 5B, and FIG. 6.

Figure 6:
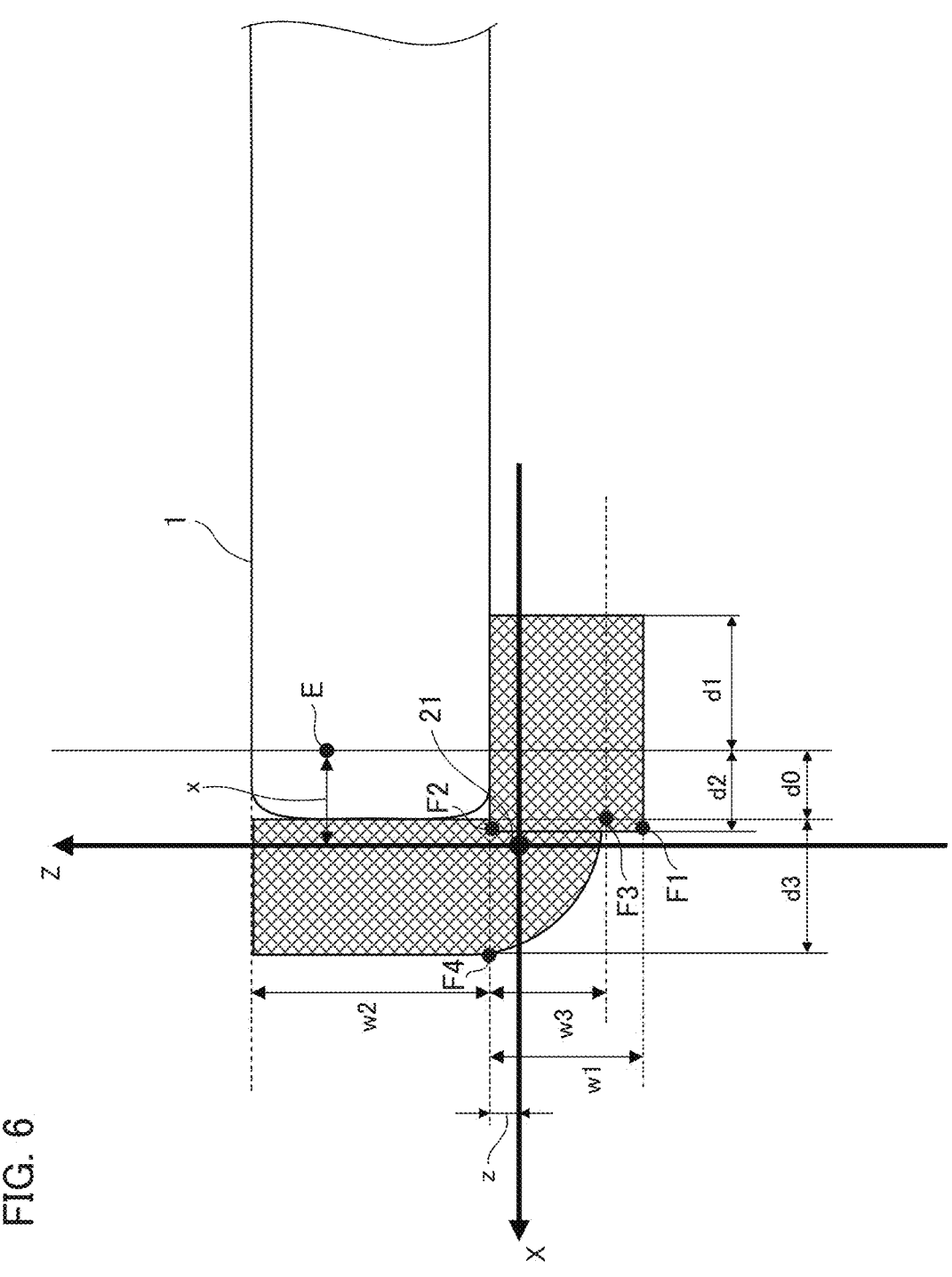
FIG. 6 is a plan view of the vehicle 1 viewed from above according to the First Embodiment of the present invention.

FIG. 6 is a plan view of the vehicle 1 of the First Embodiment viewed from above. The X and Z directions in FIG. 6 correspond to those in FIG. 5, with the installation position of the image capturing apparatus 21 as the origin. The vehicle near-field blind spot region is the region on the ground shown by the hatched portion in FIG. 5A and FIG. 6, and is a region that the driver needs to check with the side under mirror and under mirror of the vehicle.

In addition, the position of the corner farther from the vehicle side surface in the forward direction of the prescribed vehicle near-field blind spot region under the side surface of the vehicle is defined as position F1. Furthermore, the position of the corner closer to the vehicle side surface in the forward direction of the prescribed vehicle near-field blind spot region under the side surface of the vehicle is defined as position F2.

The position of the corner at a distance w3 from the vehicle side surface in the prescribed vehicle near-field blind spot region under the front of the vehicle is defined as position F3. The position at a distance d3 from the front corner of the vehicle in the prescribed vehicle near-field blind spot region under the front of the vehicle is defined as position F4.

Comparing positions F1 and F3, the position farther from vehicle 1 needs to be within the angle of view of the image capturing apparatus 21. In addition, with respect to position F2 and position F4, because position F2 is in the side blind spot and position F4 is in the front blind spot, position F4 is more forward.

The prescribed vehicle near-field blind spot region is a region on the ground defined by widths w1 and w2 from the side surface of the vehicle body, at the distance do from the viewpoint position E to the front tip of the vehicle, distances d1 and d2 from the viewpoint position E, and distance d3 from the front tip of the vehicle.

The image capturing apparatus 21 is installed so that the prescribed vehicle near-field blind spot region is included in the image capturing angle of view, and in addition to satisfying Equation 1, positions at distance d1, distance d0+d3, width w1, and width w2 from the viewpoint position E are included in the image capturing angle of view.

That is, the image capturing apparatus 21 is installed so as to satisfy conditions (Equation 2 and Equation 3) wherein the angles in the directions of the regions at distances d1 and d0+d3 from the viewpoint position E are included within the image capturing angle of view ($\varphi v - \theta v - \theta l v$) to ($\varphi v + \theta v + \theta l v$) of the image capturing apparatus 21.

The angles towards the regions at distances d1 and d0+d3 from the viewpoint position E range from ($-A \tan ((x+d1)/h1)$) to ($A \tan ((-x+d0+d3)/h1)$).

$$\varphi v - \theta v - \theta l v \le -A\tan\big((x + d1)/h1\big) \le \varphi v + \theta v + \theta l v \qquad \text{(Equation 2)}$$

$$\varphi v - \theta v - \theta l v \le A\tan\big((-x + d0 + d3)/h1\big) \le \varphi v + \theta v + \theta l v \qquad \text{(Equation 3)}$$

In addition, the image capturing apparatus 21 is installed so as to satisfy conditions (Equations 4 to 6) wherein the angles in the directions of the regions at widths w1 and w2 from the viewpoint position E are included within the image capturing angle of view ($\varphi h - \theta h - \theta l h$) to ($\varphi h + \theta h + \theta l h$) of the image capturing apparatus 21.

The angles in the directions of the regions at widths w1 and w2 from the viewpoint position E range from ($-A \tan ((w1-z)/h1)$) to ($A \tan ((w2+z)/h1)$).

$$\varphi h - \theta h - \theta l h \le A\tan\big((w2 + z)/h1\big) \le \varphi h + \theta h + \theta l h \qquad \text{(Equation 4)}$$

$$\varphi h - \theta h - \theta l h \le -A\tan\big((w1 - z)/h1\big) \le \qquad \text{(Equation 5)}$$
$$\varphi h + \theta h + \theta l h (\text{when } w1 \ge w3)$$

$$\varphi h - \theta h - \theta l h \le -A\tan\big((w3 - z)/h1\big) \le \qquad \text{(Equation 6)}$$
$$\varphi h + \theta h + \theta l h (\text{when } w1 < w3)$$

By installing the image capturing apparatus 21 to satisfy the above Equation 2 to Equation 6, it is possible to capture images of the prescribed vehicle near-field blind spot region. The above-described installation conditions of Equations 2 to 6 are defined as the first condition.

Next, the image capturing regions necessary for the image capturing apparatus 21 to detect detection targets in the forward direction (forward detection region of the vehicle and side collision detection region of the vehicle) will be explained by using FIG. 7 and FIG. 8.

Figure 7:
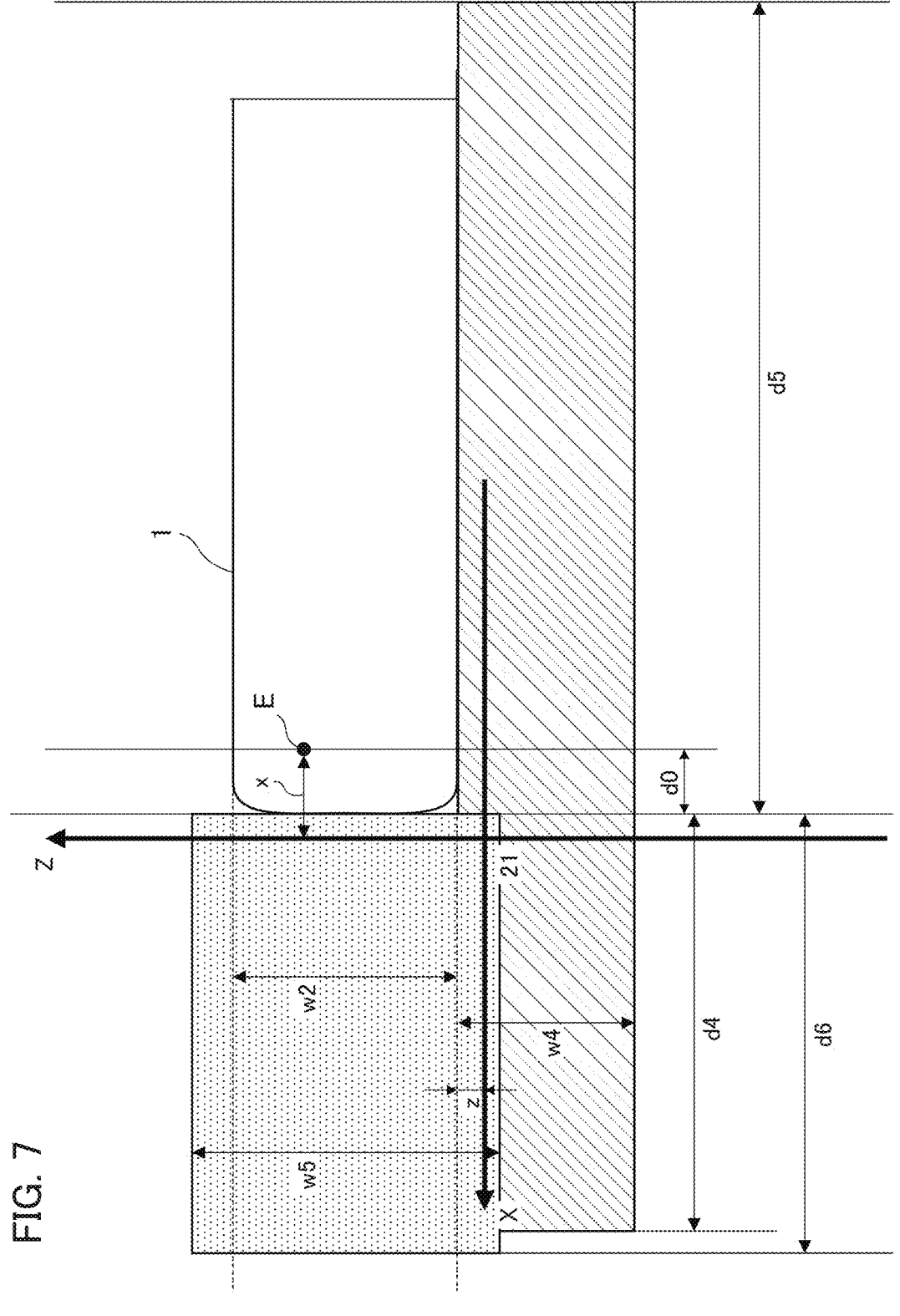
FIG. 7 is a plan view of the vehicle 1 viewed from above according to the First Embodiment of the present invention.

FIG. 7 is a plan view of the vehicle 1 of the First Embodiment viewed from above, explaining the forward detection region of the vehicle and the side collision detection region of the vehicle. FIG. 8 is a front view of the vehicle 1 viewed from the front, explaining the relationship between the image capturing apparatus 21 and the vehicle 1 of the First Embodiment. The X, Y, and Z directions and angles in FIG. 7 and FIG. 8 correspond to those in FIG. 5A, FIG. 5B, and FIG. 6, maintaining the same relationships.

Figure 8:
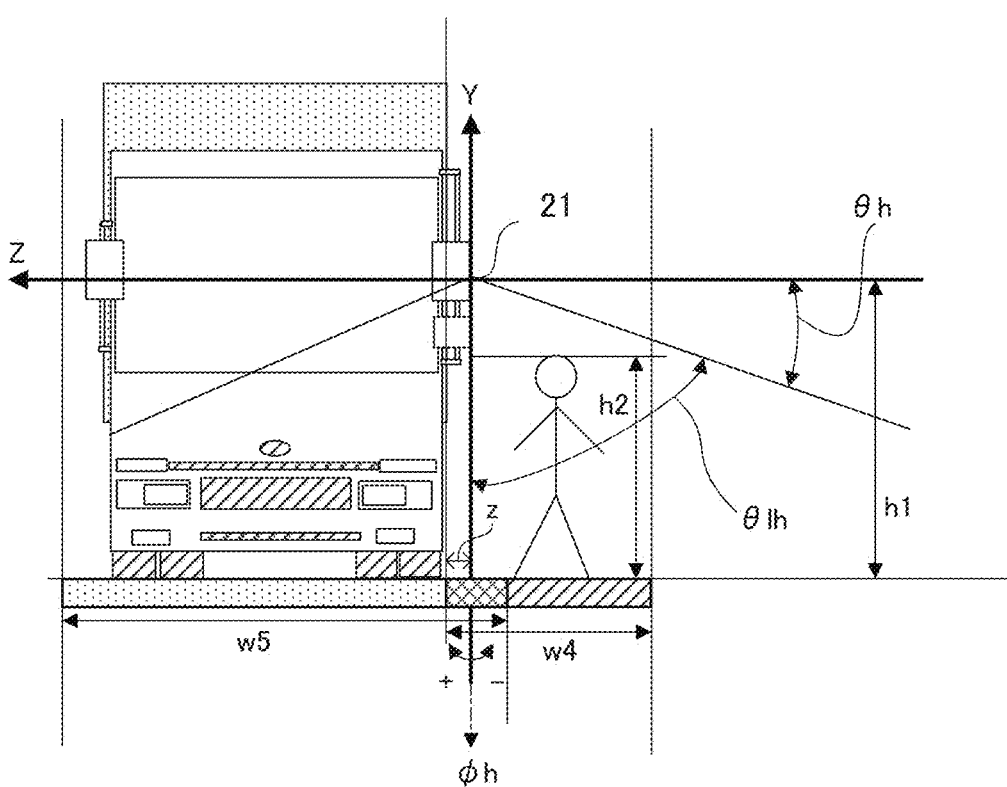
FIG. 8 is a front view of the vehicle 1 viewed from in front according to the First Embodiment of the present invention.

The viewpoint position E in FIG. 7 and FIG. 8 represents the viewpoint position of the driver. The positional relationship (x, h1, z1) between the image capturing apparatus 21 and the vehicle 1 in FIG. 7 and FIG. 8, and a relationship between the optical axis and the image capturing angle of view ($\varphi v$, $\theta v$, $\theta l v$, $\varphi h$, $\theta h$, $\theta l h$) are the same as the relationships in FIG. 5A and FIG. 5B.

Because it is necessary to capture images of detection targets in the forward detection region of the vehicle and side collision detection region of the vehicle, the height of the detection target is defined as a height h2. In a case in which the detection target is in the forward detection region of the vehicle or the side collision detection region of the vehicle, it is desirable to issue a warning by using the warning display unit 52.

In addition, in a case in which the detection target is not in the forward detection region of the vehicle or the side collision detection region of the vehicle, it is desirable not to issue a warning by means of the warning display unit 52 so as to avoid unnecessary warnings.

The installation conditions that enable capturing images of detection targets in the side collision detection region of the vehicle will be explained. The image capturing apparatus 21 is installed so as to include a detection target having a height h2 within the image capturing angle of view to capture images of the detection target. In addition, it is desirable to capture high-resolution images of detection targets in the distant forward direction.

Therefore, in the First Embodiment, the image capturing apparatus 21 is installed so as to satisfy the following installation conditions (Equation 7 to Equation 10) so that the side collision detection region of the vehicle is included within the range of the image capturing angle of view ($\varphi v - \theta v - \theta l v$) to ($\varphi v + \theta v + \theta l v$) of the image capturing apparatus 21.

That is, the image capturing apparatus 21 is installed so as to satisfy the condition (Equation 7) wherein the angle ($A \tan ((d0+d4-x)/(h1-h2))$) in the direction of the region at a distance (d0+d4) from the viewpoint position E is included within the high-resolution region 10b ($\varphi v + \theta l v$) to ($\varphi v + \theta v + \theta l v$) of the image capturing apparatus 21.

$$\varphi v + \theta l v \le A\tan\big((d0 + d4 - x)/(h1 - h2)\big) \le \varphi v + \theta v + \theta l v \qquad \text{(Equation 7)}$$

In addition, the image capturing apparatus 21 is installed so as to satisfy the condition (Equation 8) wherein the angle (−A tan ((d5−d0+x)/(h1−h2))) in the direction of the region at a distance (d5−d0) from the viewpoint position E is included within the image capturing angle of view (φv−θv−θlv) to (φv+θv+θlv) of the image capturing apparatus 21.

$$\varphi v - \theta v - \theta l v \le -A \tan\!\big((d5 - d0 + x)/(h1 - h2)\big) \le \varphi v + \theta v + \theta l v \quad \text{(Equation 8)}$$

Furthermore, the image capturing apparatus 21 is installed so as to satisfy the installation conditions (Equation 9 and Equation 10) wherein the end portion of w4 and the side surface of the vehicle are included within the image capturing angle of view of the image capturing apparatus 21.

$$\varphi h - \theta h - \theta l h \le -A \tan\!\big((w4 - z)/(h1 - h2)\big) \le \varphi h + \theta h + \theta l h \quad \text{(Equation 9)}$$

$$\varphi h - \theta h - \theta l h \le A \tan\!\big(z/(h1 - h2)\big) \le \varphi h + \theta h + \theta l h \quad \text{(Equation 10)}$$

By installing the image capturing apparatus 21 so as to satisfy the above-described Equation 7 to Equation 10, it is possible to capture images of the prescribed region that is the side collision detection region of the vehicle. The above installation conditions of Equation 7 to Equation 10 are defined as the second condition.

The installation conditions that enable capturing high-resolution images of detection targets in the forward direction will be explained. For forward detection, it is desirable to capture high-resolution images of detection targets approaching from a distant forward direction.

That is, the image capturing apparatus 21 is installed so as to satisfy the condition (Equation 11) wherein the angle (A tan ((d0+d6−x)/(h1−h2))) in the direction of the region at a distance (d0+d6) from the viewpoint position E is included within the high-resolution region 10b (φv+θlv) to (φv+θv+θlv) of the image capturing apparatus 21.

$$\varphi v + \theta l v \le A \tan\!\big((d0 + d6 - x)/(h1 - h2)\big) \le \varphi v + \theta v + \theta l v \quad \text{(Equation 11)}$$

In addition, the image capturing apparatus 21 is installed so as to satisfy the condition (Equation 12) wherein the angle (−A tan ((x−d0)/(h1−h2))) in the direction of the region at a distance d0 from the viewpoint position E is included within the image capturing angle of view (φv−θv−θlv) to (φv+θv+θlv) of the image capturing apparatus 21.

$$\varphi v - \theta v - \theta l v \le -A \tan\!\big((x - d0)/(h1 - h2)\big) \le \varphi v + \theta v + \theta l v \quad \text{(Equation 12)}$$

Furthermore, the image capturing apparatus 21 is installed so as to satisfy the installation conditions (Equation 13 and Equation 14) wherein the end portion of w5 is included within the image capturing angle of view of the image capturing apparatus 21.

$$\varphi h - \theta h - \theta l h \le -A \tan\!\big(((w5 - w2)/2 - z)/(h1 - h2)\big) \le \varphi h + \theta h + \theta l h \quad \text{(Equation 13)}$$

$$\varphi h - \theta h - \theta l h \le A \tan\!\big(((w5 + w2)/2 + z)/(h1 - h2)\big) \le \varphi h + \theta h + \theta l h \quad \text{(Equation 14)}$$

By installing the image capturing apparatus 21 so as to satisfy the above-described Equation 11 to Equation 14, it is possible to capture images of the forward detection region of the vehicle. The above-described installation conditions of Equations 11 to 14 are defined as the third condition.

Next, the installation conditions under which the image capturing apparatus 21 can capture high-resolution images in the horizontal direction for the display for a forward CTA will be explained. For the display for a forward CTA, it is desirable to display in a manner that enables confirmation of objects approaching from distant left and right directions at intersections having poor visibility. Therefore, in the First Embodiment, the image capturing apparatus 21 is installed so as to be able to appropriately check the left and right horizontal directions forward of the viewpoint position E of the driver.

That is, because the distant side in the left-right horizontal direction extends to infinity, the image capturing apparatus is installed so as to be able to capture high-resolution images of objects from nearby to the horizontal direction. Here, an example of the installation condition (Equation 15 and Equation 16) as a fourth condition that enables the image capturing apparatus 21 to capture images of at least one of the left-right horizontal directions forward of the viewpoint position E of the driver (driver seat) will be explained.

In the First Embodiment, in a case in which the image capturing apparatus 21 is forward of the viewpoint position E (x≥0), the image capturing apparatus 21 is installed so as to satisfy Equation 15 or Equation 16 as the following installation condition (the fourth condition). That is, at least one of the high-resolution regions 10b in the left-right direction ((φh−θh−θlh) to (φh−θlh) in a right direction toward the front of the vehicle and (φh+θlh) to (φh+θh+θlh) in a left direction toward the front of the vehicle) includes the left-right horizontal direction.

$$\varphi h - \theta h - \theta l h \le -90° \le \varphi h - \theta l h \quad \text{(Equation 15)}$$

$$\varphi h + \theta l h \le 90° \le \varphi h + \theta h + \theta l h \quad \text{(Equation 16)}$$

By installing the image capturing apparatus 21 so as to satisfy the above-described Equation 15 and Equation 16, it is possible to capture high-resolution images of at least one of the left and right horizontal directions for CTA display. The above-described installation conditions of Equation 15 and Equation 16 are defined as the fourth condition.

Hereinafter, actual specific values for the image capturing apparatus 21 installed in front of the passenger seat side will be explained. Here, a case in which the vehicle 1 is an automobile with dimensions of d0=0.8 m and w2=2.4 m will be explained.

In the present embodiment, the prescribed vehicle near-field blind spot region is defined as d1=1.75 m, d2=1 m, d3=2 m, w1=2 m, and w3=2 m. In addition, the side collision detection region of the vehicle is defined as d4=15 m, d5=38.3 m, and w4=4.25 m. Furthermore, the forward collision region of the vehicle is defined as d6=10 m and w5=3.5 m. A specific example of including this ground region in the image capturing apparatus 21 of the present embodiment will be explained.

For example, a case is assumed in which a camera unit is installed at a position of x=1.1 m, z=0.3 m, and h1=2.3 m, wherein the vertical angle of view θv and the horizontal angle of view θh in the high-resolution region 10b are each 23.6 degrees, and the vertical angle of view θlv and the horizontal angle of view θlh are each 66.4 degrees.

The camera unit is an example of the image capturing apparatus 21. In this case, the image capturing apparatus 21 should be installed such that the vertical angle φv of the image capturing apparatus 21 is within −54.7°≤φv≤40.1°, and the horizontal angle φh of the image capturing apparatus 21 is within −41.6°≤φh≤54.7°, as obtained from the previously mentioned Equation 2 to Equation 6.

In addition, it is desirable to include the prescribed vehicle near-field blind spot region and the side collision detection region of the vehicle within the angle of view while including the distant forward direction in the high-resolution region 10*b*. Therefore, the image capturing apparatus 21 should be installed such that the vertical angle φv of the image capturing apparatus 21 is within −3.1°≤φv≤1.2°, and the horizontal angle φh of the image capturing apparatus 21 is within −41.6°≤φh≤11.4°, as obtained from the previously mentioned Equation 2 to Equation 10.

Furthermore, it is desirable to include the prescribed vehicle near-field blind spot region and the forward detection region of the vehicle within the angle of view while including the distant forward direction in the high-resolution region 10*b*. Therefore, it is desirable for the image capturing apparatus 21 to be installed such that the vertical angle φv of the image capturing apparatus 21 is within −4.7°≤φv≤18.9°, and the horizontal angle φh of the image capturing apparatus 21 is within −13.8°≤φh≤54.7°, as obtained from Equation 2 to Equation 6, and Equation 11 to Equation 14.

In addition, to include the prescribed vehicle near-field blind spot region within the angle of view while capturing images of the left and right horizontal directions for CTA, it is desirable for the image capturing apparatus 21 to be installed such that the vertical angle φv of the image capturing apparatus 21 is within −54.7°≤φv≤40.1°, and the horizontal angle φh of the image capturing apparatus 21 is within −23.6°≤φh≤23.6°, as obtained from Equation 2 to Equation 6, and Equation 15 to Equation 16.

As described above, by installing the image capturing apparatus 21 under the first to fourth conditions, it is possible to capture images of the prescribed vehicle near-field blind spot region and furthermore, capture the detection regions around the vehicle.

It should be noted that the present embodiment need not satisfy all of the above-described first condition, second condition, third condition, and fourth condition, and includes cases in which the installation is performed so as to satisfy at least one of the first condition, the second condition, the third condition, or the fourth condition.

Second Embodiment

A Second Embodiment of the present invention explains installation conditions for installing a camera unit that also functions as an electronic side mirror, in addition to the configuration of the First Embodiment. Here, an image capturing region necessary for electronic side mirror display (prescribed region to the rear of the side surfaces of the vehicle) will be explained by using FIG. 9.

Figure 9:
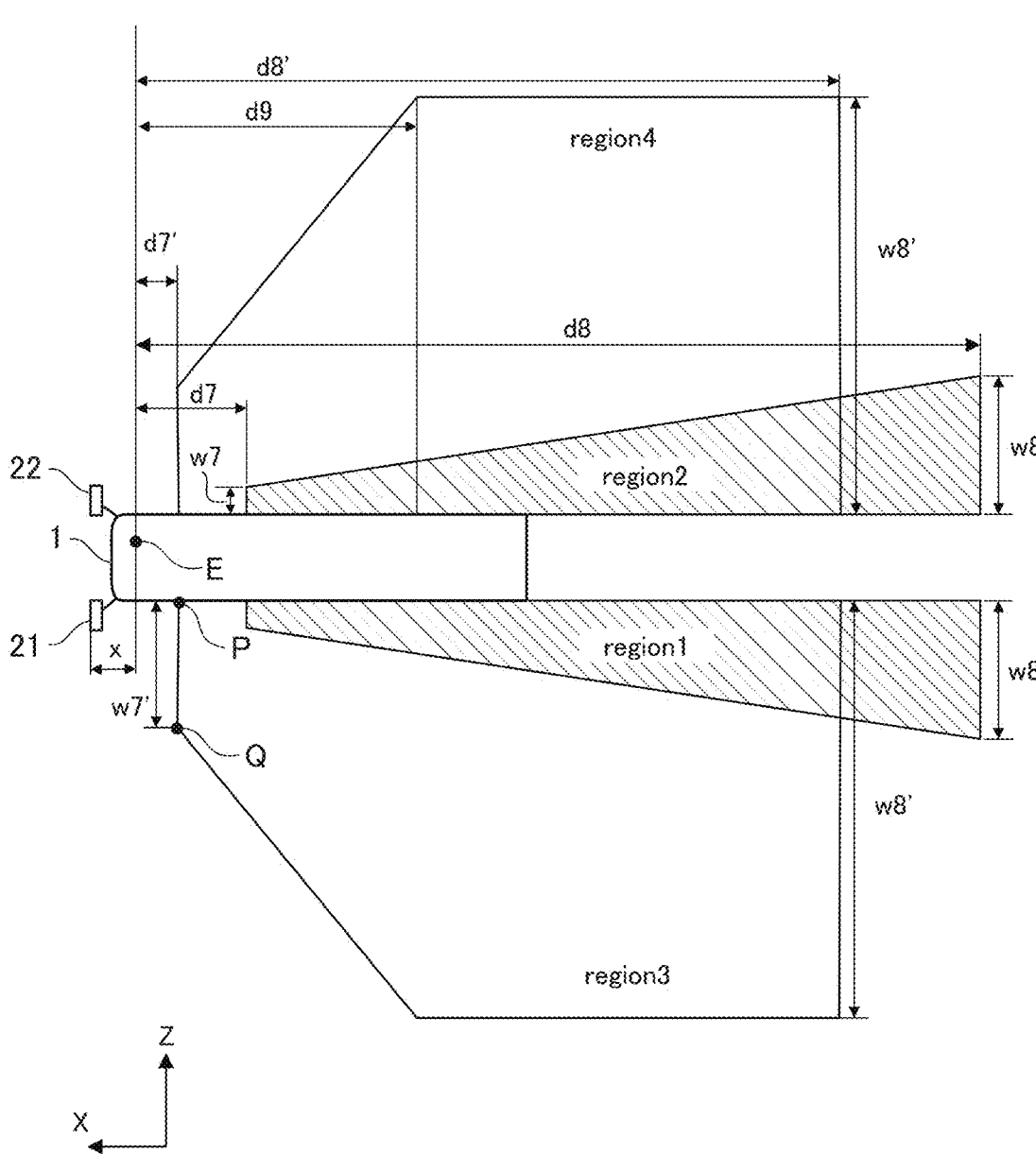
FIG. 9 is a plan view of the vehicle 1 viewed from above according to a Second Embodiment of the present invention.

FIG. 9 is a plan view of the vehicle 1 of the Second Embodiment viewed from above, wherein the X and Z directions have the installation position of the image capturing apparatus 21 as the origin. In addition, the positional relationship (x, h1, z1) between the image capturing apparatus 21 and the vehicle 1 of FIG. 9, and the relationship between the optical axis and the image capturing angle of view (φv, θv, θlv, φh, θh, θlh) are the same as those in FIG. 5A and FIG. 5B.

The prescribed region to the rear of the side surface of the vehicle is a region on the ground shown by the hatched portion in FIG. 9, and is a region that the driver needs to check with the side mirror of the vehicle.

The prescribed region to the rear of the side surface of the vehicle is a region on the ground defined by a width w7 from the side surface of the vehicle body at a distance d7 behind the viewpoint position E of the driver, and a width w8 from the side surface of the vehicle body at a distance d8. Among these prescribed regions to the rear of the side surfaces of the vehicle, the region on the passenger seat side is defined as region 1, and the region on the driver seat side is defined as region 2. Region 1 and region 2 have shapes symmetrical with respect to a longitudinal center line of the vehicle 1.

The installation conditions under which the image capturing apparatus 21 installed on the passenger seat side can capture images of the prescribed region region 1 to the rear of the side surface of the vehicle while capturing high-resolution images in the horizontal direction will be explained. Because the distant side of region 1, which is the prescribed region to the rear of the side of the vehicle, extends to infinity rearward of the vehicle, the image capturing apparatus 21 is installed so as to be able to capture images to infinity, that is, the horizontal direction in the negative direction of the X-axis.

In addition, in order to check distant objects away from the driver using images captured by the camera, it is desirable to install an image capturing apparatus so that the image capturing apparatus can capture high-resolution images from the ground direction nearby to the horizontal direction.

Therefore, in the Second Embodiment, the image capturing apparatus 21 is installed so as to satisfy the installation condition (Equation 17) wherein the horizontal angle (−90°) is included within the range of the high-resolution region 10*b* from (φv−θv−θlv) to (φv−θlv) of the image capturing apparatus 21.

$$\varphi v - \theta v - \theta l v \leq -90° \leq \varphi v - \theta l v \qquad \text{(Equation 17)}$$

In addition, in order for the prescribed region region 1 to the side of the vehicle to be included in the image capturing angle of view of the image capturing apparatus 21, the apparatus is installed so that, in addition to Equation 17, the line segment PQ (region of a width w7) of the prescribed region region 1 at a position d7 away backward from the viewpoint position E is included in the image capturing angle of view.

That is, the image capturing apparatus 21 is installed so as to satisfy the condition (Equation 18) wherein the angle (−A tan ((x+d7)/h1)) in the direction of the tip region of region 1 at a distance d7 behind the viewpoint position E is included within the image capturing angle of view (φv−θv−θlv) to (φv+θv+θlv) of the image capturing apparatus 21.

$$\varphi v - \theta v - \theta l v \leq -A \tan\big((x + d7)/h1\big) \leq \varphi v + \theta v + \theta l v \qquad \text{(Equation 18)}$$

In addition, the image capturing apparatus 21 is installed so as to satisfy the installation condition (Equation 19)

wherein the end portion of w8 is included within the image capturing angle of view of the image capturing apparatus 21.

$$\varphi h - \theta h\text{-}\theta lh \le -A\ \tan((w8 - z)/h1) \le \varphi h + \theta h + \theta lh \qquad \text{(Equation 19)}$$

By installing the image capturing apparatus 21 so as to satisfy the above installation conditions of Equation 17 to Equation 19 (the fifth condition), the image capturing apparatus 21 can capture images of the prescribed region region 1 to the rear of the side surface of one side of vehicle 1 while capturing high-resolution images in the horizontal direction. It should be noted that here, the side surface of one side of the vehicle 1 refers to the side surface on the passenger seat side.

By satisfying the conditions of Equation 17 to Equation 19 as described above, it is possible to include the rearward direction of the side of vehicle 1 within the image capturing angle of view. Furthermore, in order to include the pre-scribed vehicle near-field blind spot region, the forward detection region of the vehicle, and the side collision detection region of the vehicle, it is desirable to direct the optical axis of the image capturing apparatus 21 in a ground direction in addition to the above Equation 17 to Equation 19 and the first condition, the second condition, and the third condition.

Furthermore, in order to capture high-resolution images in the horizontal direction for CTA display, it is desirable to add the fourth condition to the above Equation 17 to Equation 19, the first condition, the second condition, and the third condition.

It should be noted that in large vehicles, it is desirable to be able to check a wider range than a prescribed region to the rear of a side surface of the vehicle (a prescribed wide region to the rear of a side surface of the vehicle).

The prescribed wide regions to the rear of the side surfaces of the vehicle are defined as regions (region 3, region 4) on the ground. Region 3 and region 4 are defined by a width w7' from the side surfaces of the vehicle body at a distance d7' behind the viewpoint position E of the driver.

Region 3 and region 4 are defined by a width w8' from the side surfaces of the vehicle body at a distance d9 behind the viewpoint position E. Region 3 and region 4 are defined by a width w8' from the side surfaces of the vehicle body at a distance d8' behind the viewpoint position E. The image capturing apparatus 21 disposed on the passenger seat side can correspond to an installation condition of a large vehicle when the image capturing apparatus 21 is installed so that the prescribed wide region region 3 to the rear of the side surfaces of the vehicle is included in the image capturing range.

It should be noted that the present embodiment need not satisfy all of the above-described first condition, second condition, third condition, fourth condition, and fifth condition, and includes a case in which the installation is performed so as to satisfy the fifth condition and at least one of the first condition, the second condition, the third condition, or the fourth condition.

The installation conditions for the image capturing apparatus 21 on the passenger seat side have been explained above. The image capturing apparatus 22 arranged on the driver seat side is arranged under similar installation conditions. Thereby, it is possible to capture images by means of a smaller number of cameras.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the movable apparatus or the like through a network or various storage media. Then, a computer (or a CPU, an MPU, or the like) of the movable apparatus or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-203667, filed on Dec. 1, 2023, which is hereby incorporated by reference herein in its entirety.

What is claimed is:

1. A movable apparatus comprising an image capturing apparatus configured to include an optical system that forms an optical image having a high-resolution region on the outer side of an optical axis on a light-reception surface of an image capturing unit, wherein the image capturing apparatus is arranged so as to capture images in a forward direction of the movable apparatus, in a side direction of the movable apparatus, in a vertically downward facing direction to a side of the movable apparatus, and in a vertically downward facing direction in a forward direction of the movable apparatus, wherein the image capturing apparatus is arranged such that the high-resolution region of the optical system captures images in the forward direction of the movable apparatus, and wherein, in a state in which an angle of an optical axis direction from a vertical direction when the movable apparatus is viewed from the front is φh, an angle of view of the high resolution region is θh, and an angle of view of the low resolution region is θlh, $$\varphi h - \theta h - \theta lh \le -90^\circ \le \varphi h - \theta lh$$

$$\varphi h + \theta lh \le 90^\circ \le \varphi h + \theta h + \theta lh$$

are satisfied.

2. The movable apparatus according to claim 1, wherein the optical system comprises a low-resolution region near an optical axis, and comprises projection characteristics in which an image height with respect to an angle of view per unit is higher in an angle of view of the high-resolution region compared to an angle of view of the low-resolution region near the optical axis.

3. The movable apparatus according to claim 1, wherein, in a state in which an image height of the optical system is y and a half angle of view is θ, a projection characteristic y(θ) satisfies the following condition $$0.2 < 2 \times f \times \tan\left(\theta\,\max/2\right)/y(\theta\ \max) < 0.92.$$

21

4. The movable apparatus according to claim 1,
wherein an optical axis direction of the optical system is in a ground direction from the installation position of the image capturing apparatus.

5. The movable apparatus according to claim 1,
wherein, in a state in which an angle of an optical axis direction from a vertical direction when the movable apparatus is viewed from the side is φv, an angle of view of the high resolution region is θv, and an angle of view of the low resolution region is θlv, a predetermined distance in the rearward direction from a viewpoint position of a driver is d1, a distance between the viewpoint position and the installation position of the image capturing apparatus is x, a vertical distance between the installation position and the ground is h1, a distance between the installation position and the side surface of the movable apparatus is z, a distance from the viewpoint position to a tip of the movable apparatus is do, a distance from the tip of the movable apparatus to a predetermined position to be checked in the forward downward direction is d3, a distance to be checked from the side of the movable apparatus is w1, a width of the movable apparatus is w2, and a distance to be checked from the side of the movable apparatus under a front of the movable apparatus is w3, $$\varphi v - \theta v - \theta lv \le -A\,\tan\big((x+d1)/h1\big) \le \varphi v + \theta v + \theta lv$$

$$\varphi v - \theta v - \theta lv \le A\,\tan\big((-x+d0+d3)/h1\big) \le \varphi v + \theta v + \theta lv$$

$$\varphi h - \theta h - \theta lh \le A\,\tan\big((w2+z)/h1\big) \le \varphi h + \theta h + \theta lh$$

$$\varphi h - \theta h - \theta lh \le -A\,\tan\big((w1-z)/h1\big) \le \varphi h + \theta h + \theta lh\ (\text{when } w1 \ge w3)$$

$$\varphi h - \theta h - \theta lh \le -A\,\tan\big((w3-z)/h1\big) \le \varphi h + \theta h + \theta lh\ (\text{when } w1 < w3)$$

are satisfied.

6. The movable apparatus according to claim 1,
wherein, in a state in which an angle of an optical axis direction from a vertical direction when the movable apparatus is viewed from the side is φv, an angle of view of the high resolution region is θv, and an angle of view of the low resolution region is θlv, a predetermined distance in the forward direction from a viewpoint position of a driver is d4, a predetermined distance in the rearward direction from the viewpoint position is d5, a distance between the viewpoint position and the installation position of the image capturing apparatus is x, a vertical distance between the installation position and the ground is h1, a distance from the viewpoint position to a tip of the movable apparatus is d0, and a height of a target object for checking in the movable apparatus is h2, $$\varphi v + \theta lv \le A\,\tan\big((d0+d4-x)/(h1-h2)\big) \le \varphi v + \theta v + \theta lv$$

$$\varphi v - \theta v - \theta lv \le -A\tan\big((d5-d0+x)/(h1-h2)\big) \le \varphi v + \theta v + \theta lv$$

are satisfied.

22

7. The movable apparatus according to claim 6, wherein, in a state in which a distance for checking to the side of the movable apparatus is w4, and a distance between the installation position and the side surface of the movable apparatus is z, $$\varphi h - \theta h - \theta lh \le -A\,\tan\big((w4-z)/(h1-h2)\big) \le \varphi h + \theta h + \theta lh$$

$$\varphi h - \theta h - \theta lh \le A\,\tan\big(z/(h1-h2)\big) \le \varphi h + \theta h + \theta lh$$

are satisfied.

8. The movable apparatus according to claim 1,
wherein, in a state in which an angle of an optical axis direction from a vertical direction when the movable apparatus is viewed from the side is φv, an angle of view of the high resolution region is θv, and an angle of view of the low resolution region is θlv, a predetermined distance in the forward direction from a viewpoint position of a driver that drives the movable apparatus is d6, a distance between the viewpoint position and the installation position of the image capturing apparatus is x, a vertical distance between the installation position and the ground is h1, a distance from the viewpoint position to a tip of the movable apparatus is d0, and a height of a target object for checking in the movable apparatus is h2, $$\varphi v + \theta lv \le A\,\tan\big((d0+d6x)/(h1-h2)\big) \le \varphi v + \theta v + \theta lv$$

$$\varphi v - \theta v - \theta lv \le -A\tan\big((x-d0)/(h1-h2)\big) \le \varphi v + \theta v + \theta lv$$

are satisfied.

9. The movable apparatus according to claim 8,
wherein, in a state in which a width of the movable apparatus is w2, a width for checking in the forward direction of the movable apparatus is w5, and a distance between the installation position and the side surface of the movable apparatus is z, $$\varphi h - \theta h - \theta 1 h \le -A\,\tan\big(((w5-w2)/2-z)/(h1-h2)\big) \le \varphi h + \theta h + \theta lh$$

$$\varphi h - \theta h - \theta lh \le A\tan\big(((w5+w2)/2+z)/(h1-h2)\big) \le \varphi h + \theta h + \theta lh$$

are satisfied.

10. The movable apparatus according to claim 1,
wherein one side surface of the movable apparatus is the side surface on the passenger seat side of the movable apparatus.

11. The movable apparatus according to claim 1,
wherein, in a state in which an angle of an optical axis direction from a vertical direction when the movable apparatus is viewed from the side is φv, an angle of view of the high resolution region is θv, and an angle of view of the low resolution region is θlv, a predetermined distance in the rearward direction from a viewpoint position of a driver that drives the movable apparatus is d7, a distance between the viewpoint position and the installation position of the image capturing apparatus is x, and

a vertical distance between the installation position and the ground is h1, $$\varphi v - \theta v - \theta l v \leq -90° \leq \varphi v - \theta l v$$

$$\varphi v - \theta v - \theta l v \leq -A \tan\bigl((x + d7)/h1\bigr) \leq \varphi v + \theta v + \theta l v$$

are satisfied.

\* \* \* \* \*